M. Bayley.
Cloth Finishing Mach.
No. 24. Reissued Sept. 5, 1840.
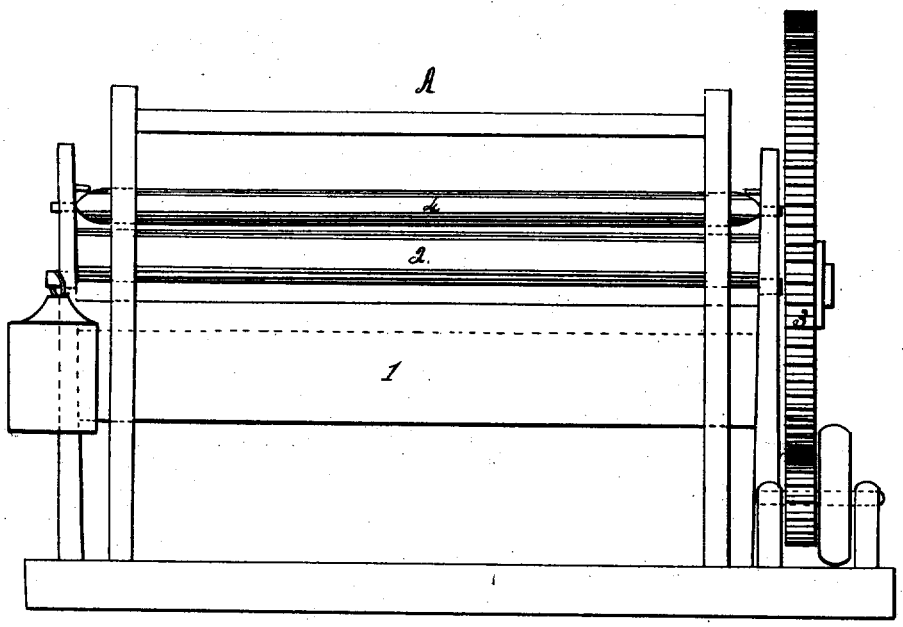
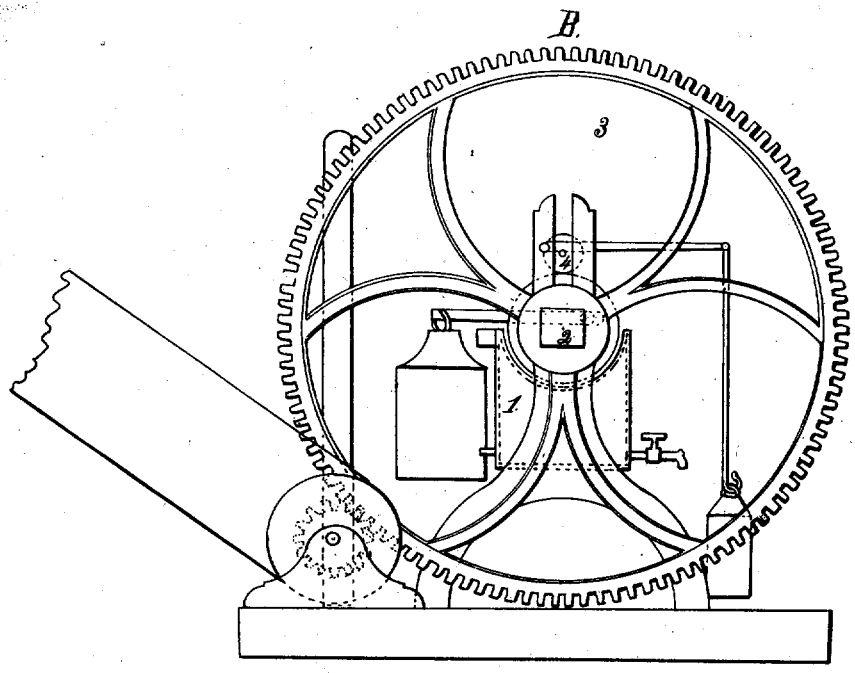
N. PETERS, PHOTO-LITHOGRAPHER, WASHINGTON, D. C.

UNITED STATES PATENT OFFICE.

MOSES BAYLEY, OF SALISBURY, MASSACHUSETTS.

IMPROVEMENT IN ROTARY PRESSES FOR PRESSING WOOLEN AND COTTON GOODS.

Specification forming part of Letters Patent No. 251, dated July 5, 1837; Reissue No. 24, dated September 5, 1840.

*To all whom it may concern:*

Be it known that I, MOSES BAYLEY, of Salisbury, in the county of Essex and Commonwealth of Massachusetts, have invented a new and useful Machine for Pressing all Kinds of Woolen and Cotton Goods, and all Kinds of Paper. I have given it the name of the "Rotary Press;" and I do hereby declare that the following is a full and exact description of the same.

The object of the machine is to press all kinds of woolen and cotton goods and all kinds of paper.

The specification will be more intelligible by a reference to the accompanying drawings.

Drawing marked A presents a view of the broad side of the machine. Drawing marked B exhibits one end of the machine.

The machine consists of a box (marked 1 in the drawings) in the form of a parallelogram, having the upper side a concave surface to receive the cylinder. The sides of the box and the ends may be made of wood, but will be best if made of cast-iron or some other hard metal. The concave side must be of metal or any other material that can be made smooth and hard. The box is tight, and when a hot press is required is heated by being filled with steam. It has an aperture for a pipe to admit the steam, and also an aperture to let it off. A stop-cock is inserted in the box to draw off the condensed steam. The steam discharged from the box may be applied to any other purpose for which steam is used. The cylinder 2 is made of wood, stone, metal, or any other material that will answer the purpose, and of the same length with the box. The diameter of the cylinder must be made to fit exactly the diameter of the concave, either by winding cloth around it or some other way. Should the cylinder not be heavy enough to press the cloth sufficiently hard, it may be held down by means of levers and weights, springs, screws, or any other means by which pressure can be obtained. A large cog-wheel, 3, is fastened to one end of the cylinder, with a small pinion gearing with it. The whole is put in motion by a pulley and belt. A small wooden roller, 4, lies on the top of the cylinder and winds up the cloth as fast as it is pressed. This roller receives its motion from the cylinder, and is held down to it by a lever and weights at each end.

The operation of the machine is obvious. The cloth is pressed by passing between the concave surface of the box and the cylinder. It then winds upon the roller on the top of the cylinder, where it should remain a few hours in order to retain the press. The length and breadth of the box and the diameter and speed of the cylinder are not given, as they will depend upon the kinds of goods to be pressed.

What I claim as my invention in the within described apparatus for pressing cloth or paper is—

The using of a metallic box, or a box the sides and ends of which are wood while the top or concave side is metallic or any other material that can be made smooth and hard, the box so formed that a pressing-roller may be made to revolve within the concave extending along it, and into which box steam or other heated material may be admitted when required, the whole constructed for the pressing, ironing, or calendering of cloth and paper, either hot or cold, substantially in the manner herein set forth.

MOSES BAYLEY.

Witnesses:
JOSHUA AUBIN,
ROBERT CROSS.